(12) United States Patent
Ueno

(10) Patent No.: US 8,248,615 B2
(45) Date of Patent: Aug. 21, 2012

(54) REFLECTIVE PHOTOELECTRIC SENSOR AND OBJECT DETECTING METHOD

(75) Inventor: Tatsuya Ueno, Tokyo (JP)

(73) Assignee: Azbil Corporation, Tokyo (JP)

( * ) Notice: Subject to any disclaimer, the term of this patent is extended or adjusted under 35 U.S.C. 154(b) by 401 days.

(21) Appl. No.: 12/509,554

(22) Filed: Jul. 27, 2009

(65) Prior Publication Data

US 2010/0073683 A1    Mar. 25, 2010

(30) Foreign Application Priority Data

Sep. 22, 2008   (JP) ................................ 2008-242392

(51) Int. Cl.
*G01B 11/02* (2006.01)
(52) U.S. Cl. ...................................................... 356/498
(58) Field of Classification Search .................... 356/498
See application file for complete search history.

(56) References Cited

U.S. PATENT DOCUMENTS

| | | | |
|---|---|---|---|
| 5,267,016 A | * | 11/1993 | Meinzer et al. ............... 356/498 |
| 6,359,735 B1 | | 3/2002 | Gombert et al. |
| 2008/0181354 A1 | | 7/2008 | Ueno |

FOREIGN PATENT DOCUMENTS

JP   06-111693 A   4/1994

OTHER PUBLICATIONS

G. Giuliani et al., Laser Diode Self-Mixing for Sensing Applications, Journal of Optics A: Pure and Applied Optics, No. 4, Nov. 4, 2002, pp. S283-S294.
J. Yamada et al., Study of Compact Distance Meter by Self-Coupled Effect of Laser Diode, Acichi Institute of Technology Study Report, No. 31B, 1996, pp. 35-42 (English abstract provided).

* cited by examiner

*Primary Examiner* — Tarifur Chowdhury
*Assistant Examiner* — Jonathon Cook
(74) *Attorney, Agent, or Firm* — McDermott Will & Emery LLP

(57) ABSTRACT

To reduce the probability of incorrect determination to detect an object reliably. A reflective photoelectric sensor is provided with: a light projecting device for emitting light; a light receiving device for receiving the optical feedback of the light that is emitted from the light projecting device; a determining portion for determining whether or not an object exists in the direction in which the light is emitted from the light projecting device, based on the optical feedback; and a reflection preventing plate of a moth-eye structure, disposed at a position that is on the optical path of the light that is emitted from the light projecting device at a position that is more distant than the location wherein the object is anticipated to appear.

14 Claims, 9 Drawing Sheets

REFLECTIVE PHOTOELECTRIC SENSOR AND OBJECT DETECTING METHOD

INCORPORATION BY REFERENCE

The present invention claims priority under 35 U.S.C. §119 to Japanese Patent Application No. 2008-242392 filed Sep. 22, 2008. The content of the application is incorporated herein by reference in its entirety.

FIELD OF TECHNOLOGY

The present invention relates to a reflective photoelectric sensor, and an object detecting method, for detecting whether or not it there is an object using light reflected from an object.

BACKGROUND OF THE INVENTION

A traditional reflective photoelectric sensor detects whether or not there is an object by a change in the magnitude of optical feedback that is produced through a reflection on an object. Because of this, when the reflectivity of the background is large and the reflectivity of the object is small when comparing the reflectivities of the object and the background, there will be cases wherein the background is detected as the object. There are photoelectric sensors of a polarized type (in, for example, Japanese Unexamined Patent Application Publication H6-111693) and photoelectric sensors of a background setting reflective type (background suppression type, hereinafter abbreviated "BGS") as reflective photoelectric sensors that are less susceptible to the effects of the background. (See, for example, Japanese Unexamined Utility Model Registration Application Publication S63-102135 ("JP '135") and Japanese Unexamined Utility Model Registration Application Publication S63-187237 ("JP '237").

In the polarized-type photoelectric sensors, a light projecting/receiving device and a reflex reflector are disposed facing each other, and a polarizing filter for emitting polarized light having a specific plane of polarization is disposed at the front surface of the light projecting device, and a polarizing filter for receiving polarized light having a plane of polarization that is perpendicular to that of the light projecting device side is disposed at the front surface of the light receiving device. The reflex reflector is a corner cube set, wherein the incident light is returned in the same direction as the incident light after being completely reflected three times.

The light that is emitted from the light projecting device becomes linearly polarized light through passing through the polarizing filter on the light projecting device side. When this linearly polarized light is incident into the reflex reflector, the reflected light becomes elliptically polarized light, producing a polarization component that is perpendicular to the incident light. Consequently, this polarization component passes through the polarizing filter on the light receiving device side to be incident into the light receiving device. On the other hand, when an object incurs between the light projecting/receiving device and the reflex reflector, light that is linearly polarized in the same direction as the incident light is reflected. This linearly polarized light cannot pass through the polarizing filter on the light receiving device side, and so is not incident into the light receiving device. In this way, the polarized photoelectric sensor is able to detect whether or not there is an object based on whether or not there is light incident into the light receiving device.

The BGS photoelectric sensor detects whether the distance of an object is more distant or closer than a predetermined reference distance by measuring the distance of the object optically.

On the other hand, there have been proposals for laser measuring devices that use interference (the self-coupling effect) within the semiconductor laser between the laser output light and the optical feedback from the measurement object as distance meters using interference of the light from a laser. (See, for example, UEDA Tadashi, YAMADA Jun, SHITO Susumu: "Distance Measurement Using the Self-Coupling Effect of Semiconductor Lasers," 1994 Annual Joint Conference Lecture Proceedings of the Tokai Branch of the Electrical Society, 1994; YAMADA Jun, SHITO Susumu, TSUDA Norio, UEDA Tadashi: "Research regarding Small Distance Meter Using the Self-Coupling Effect of Semiconductor Lasers," Aichi Institute of Technology Research Reports, 31B, Pages 35-42, 1996; and, Guido Giuliani, Michele Norgia, Silvano Donati, and Thierry Bosch, "Laser Diode Self-Mixing Technique for Sensing Applications," Journal of Optics A: Pure and Applied Optics, Pages 283 through 294, 2002.) An FP-type (Fabry-Perot type) semiconductor laser compound resonator model is illustrated in FIG. 8. In FIG. 8: 101 is a semiconductor laser; 102 is a wall open surface in the semiconductor crystal; 103 is a photodiode; and 104 is a measurement object.

When the laser oscillation wavelength is defined as $\lambda$ and the distance to the measurement object 104 from the wall open surface 102 that is closer to the measurement object 104 is defined as L, then the laser output becomes slightly increased due to the reinforcing of the laser light within the resonator 101 with the optical feedback from the measurement object 104:

$$L = q\lambda/2 \tag{1}$$

In Equation (1), q is an integer. This phenomenon can be fully observed through the occurrence of an amplifying effect through the amplification of the apparent reflectivity within the resonator 101 of the semiconductor laser, even if the scattered light from the measurement object 104 is extremely weak.

The semiconductor laser emits laser light that will vary in the frequency depending on the magnitude of the injected electric current, so that it is possible to modulate the laser directly, through the injected electric current, without requiring an external modulating device, when modulating the oscillation frequency. FIG. 9 is a diagram illustrating the relationship between the oscillation wavelength and the output waveform of the photodiode 103 when the semiconductor laser oscillating wavelength is varied at a constant rate. When the L=q $\lambda/2$ indicated in Equation (1) is satisfied, then there will be a phase difference of 0° (that is, equal phases) between the optical feedback and the laser light within the resonator 101, where the optical feedback and the laser light within the resonator 101 will reinforce each other most strongly, and when L=q $\lambda/2+\lambda/4$, then the phase difference will be 180° (opposite phases), so that the laser light in the optical feedback resonator 101 will weaken each other the most. Because of this, places where the laser output becomes stronger and places wherein the laser output becomes weaker will appear repetitively alternatingly as the oscillation wavelength of the semiconductor laser is varied, at which time the detection of the laser power by the photodiode 103 that is provided in the resonator 101 can produce a waveform that undergoes steps at specific periods, as illustrated in FIG. 9. This type of waveform is typically known as an interference fringe.

In this stepped waveform, the individual interference fringes are known as mode hop pulses (hereinafter termed "MHPs"). An MHP is a different phenomenon from the mode hopping phenomenon. For example, when the distance from the measurement object 104 is L1, then if the number of MHPs is 10, then at half the distance, L2, the number of MHPs would be 5. That is, when there is a change in the oscillating wavelength of the semiconductor laser in a given time interval, then the number of MHPs will vary proportionately to the measurement distance. Consequently, the distance can be measured easily by measuring the frequency of the MHPs by detecting the MHPs using a photodiode 103.

The use of a self-coupling laser measuring device as set forth above enables a BGS photoelectric sensor to be achieved. The BGS photoelectric sensor may make an ON/OFF determination as to whether or not the object is at a near distance or at a far distance by comparing to a predetermined reference wavelength. Given this, when a self-coupling laser measuring device is used as a BGS photoelectric sensor, then the determination may be whether the average period of the measured MHP is longer or shorter than a known reference period of an MHP when the object is at the position of the reference distance. If the average period of the measured MHP is longer than the known reference period of the MHP when the object is positioned at the reference distance, then an ON determination is made that there is an object at a distance that is closer than then reference distance, and if the MHP period is shorter, then an OFF determination is made, as the object existing at a distance that is more distant than the reference distance.

As described above, in reflective photoelectric sensors that detect the presence or absence of an object based on the magnitude of the optical feedback, there is a problem in that there is a susceptibility to the influence of the background. Additionally, in the polarized photoelectric sensor, even though there is no effect of the background because the sensor explicitly senses the background (the reflex reflector), it is possible, when there is an object with characteristics such as disrupting polarization, that it may be impossible to detect this object.

Additionally, in a BGS photoelectric sensor, even though there is no effect from a background that exists at a distance that is more distant than any reference distance, if there is a mirrored surface in the background, or if the object is near to a mirrored surface, then there is the possibility that the operation will be destabilized due to the reflected light from the mirrored surface.

Additionally, in the BGS photoelectric sensor that uses a self-coupling laser measuring device, if the distance between the sensor and the background is close, then the magnitude of light returned from the background will be greater, but if the magnitude of the optical feedback is too large, then there will be a dramatic increase in the noise that is produced with in the laser, producing a coherent collapse phenomenon wherein the operation of the laser becomes unstable. Hence there will be the possibility of an error in the distance measurement due to an error in the MHP measurement, resulting in an incorrect determination.

Furthermore, in a BGS photoelectric sensor that uses a self-coupling laser measuring device, if the background is far, so that no MHPs occur through the self-coupling effect, or if it is not possible to obtain an adequate signal strength in the MHP detection, there will still be the possibility of the occurrence of noise, such as optical chaos, through the extremely small amounts of optical feedback from the background, and there is the possibility of an incorrect determination resulting from this noise.

The present invention was created in order to solve the problem areas set forth above, and the object thereof is to reduce the possibility of an incorrect determination, to provide a reflective photoelectric sensor and object detecting method wherein it is possible to detect an object reliably.

SUMMARY OF THE INVENTION

The reflective photoelectric sensor as set forth in the present invention includes: light projecting means for emitting light; light receiving means for receiving optical feedback from the light emitted from the light projecting means; evaluating means for determining whether or not an object exists in the direction in which the light is emitted from the light projecting means, based on the optical feedback; and a reflection preventing plate of a moth-eye structure, disposed at a position on the optical path of the light that is emitted from the light projecting means at a position that is more distant than the location at which the object is anticipated to appear.

Additionally, in an example of the reflective photoelectric sensor as set forth in the present invention, the evaluating means determines whether or not an object exists in the direction in which the light is emitted, based on the optical feedback. Additionally, the evaluating means determines that an object exists in the direction in which the light is emitted when the distance is closer than a predetermined reference distance when calculating the distance of the point of reflection of the optical feedback based on the optical feedback.

Additionally, a reflective photoelectric sensor according to the present invention has: a semiconductor laser for emitting a laser light; a laser driver for driving the semiconductor laser; light receiving means for converting into an electric signal the laser light that is emitted from the semiconductor laser and the optical feedback from this laser light; distance determination processing means for calculating the distance of the point of reflection of the optical feedback, based on information for an interference waveform that is generated by the laser light and the optical feedback, included in the output information of the light receiving means, to determine that an object exists in the direction in which the laser light is emitted, if this distance is closer than a predetermined reference distance; and a reflection preventing plate with an amorphous structure, disposed at a position on the optical path of the laser light that is emitted from the semiconductor laser at a position that is more distant than the location at which the object is anticipated to appear.

Additionally, a reflective photoelectric sensor according to the present invention includes: a semiconductor laser for emitting a laser light; a laser driver for driving the semiconductor laser; detecting means for detecting an electric signal that includes an interference waveform that is produced through the self-coupling effect between the laser light that is emitted from the semiconductor laser and the optical feedback of this laser light; distance determination processing means for transmitting the distance of the point of reflection of the optical feedback, based on the interference waveform information that is included in the output signal from the detecting means, to determine that an object exists in the direction of the emission of the laser light if the distance is closer than a predetermined reference distance; and a reflection preventing plate with an amorphous structure, disposed at a position on the optical path of the laser light that is emitted from the semiconductor laser at a position that is more distant than the location at which the object is anticipated to appear.

Additionally, in the example of a reflective photoelectric sensor according to the present invention, the reflection preventing plate is disposed so that the magnitude of the optical feedback from the reflection preventing plate when there is no object is greater than the critical point $\Gamma c$ and less than the critical point fextc, when the critical point $\Gamma c$ of the magnitude of the optical feedback that produces a mode competition between the resonator mode of the semiconductor laser itself and an external resonator mode, and fextc is the critical point for the magnitude of the optical feedback due to a coherent collapse.

Additionally, in the present invention, the laser driver is that which causes the semiconductor laser to operate so as to alternate between a first oscillation interval that includes at least an interval wherein the oscillation wavelength is increased continuously and monotonically, and a second oscillation interval which includes at least an interval wherein the oscillation wavelength is decreased continuously and monotonically; and wherein the distance determination processing means includes: counting means for counting the number of interference waveforms during the first oscillation interval and the number of interference waveforms during the second oscillation interval; and determining means for calculating the distance of the point of reflection of the optical feedback based on the counting results by the counting means and determining that an object exists in the direction of emission of the laser light if this distance is closer than a predetermined reference distance.

Additionally, an object detecting method according to the present invention has: a light projecting procedure for emitting light; a light receiving procedure for receiving optical feedback of the light emitted in the light projecting procedure; and a determining procedure for determining whether or not an object exists in the direction in which light is emitted in the light projecting procedure, based on the optical feedback; wherein a reflection preventing plate of a moth-eye structure is disposed at a position on the optical path of the light that is emitted in the light projecting procedure at a position that is more distant than the location at which the object is anticipated to appear.

Additionally, in the present invention, the determining procedure determines whether or not an object exists in the direction in which the light is emitted, based on the magnitude of optical feedback.

Additionally in a first composition example of the object detecting method according to the present invention, the determining procedure calculates, based on the optical feedback, the distance of the point of reflection of the optical feedback, and determines that an object exists in the direction in which the light is emitted if this distance is closer than a predetermined reference distance.

Additionally, an object detecting method according to the present invention includes: an oscillating procedure for supplying a driving electric current to a semiconductor laser to cause the semiconductor laser to operate; a light receiving procedure for converting into an electric signal the laser light emitted from the semiconductor laser and the optical feedback of that laser light; and a distance determination processing procedure for calculating the distance of the point of reflection of the optical feedback based on interference waveform information generated by the laser light and the optical feedback included in the output signal obtained from the light receiving procedure to determine that an object exists in the direction in which the laser light is emitted when this distance is closer than a predetermined reference distance; wherein a reflection preventing plate of a moth-eye structure is disposed at a position on the optical path of the laser light that is emitted from the semiconductor laser at a position that is more distant than the location at which the object is anticipated to appear.

Additionally, an object detecting method according to the present invention includes: an oscillating procedure for supplying a driving electric current to a semiconductor laser to cause the semiconductor laser to operate; a detecting procedure for detecting an electric signal including an interference waveform produced through the self-coupling effect of the laser light that is emitted from the semiconductor laser and the optical feedback from the laser light; and a distance determination processing procedure for calculating the distance of the point of reflection of the optical feedback based on interference waveform information included in the output signal obtained in the detecting procedure to determine that an object exists in the direction in which the laser light is emitted when this distance is closer than a predetermined reference distance; wherein a reflection preventing plate of a moth-eye structure is disposed at a position on the optical path of the laser light that is emitted from the semiconductor laser at a position that is more distant than the location at which the object is anticipated to appear.

Additionally, in an example of an object detecting method according to the present invention, the reflection preventing plate is disposed so that the magnitude of the optical feedback from the reflection preventing plate when there is no object is greater than the critical point Γc and less than the critical point fextc, when the critical point Γc of the magnitude of the optical feedback that produces a mode competition between the resonator mode of the semiconductor laser itself and an external resonator mode, and fextc is the critical point for the magnitude of the optical feedback due to a coherent collapse.

Additionally, in an object detecting method according to the present invention, the oscillating procedure is that which causes the semiconductor laser to operate so as to alternate between a first oscillation interval that includes at least an interval wherein the oscillation wavelength is increased continuously and monotonically, and a second oscillation interval which includes at least an interval wherein the oscillation wavelength is decreased continuously and monotonically; and wherein the distance determination processing means includes: counting means for counting the number of interference waveforms during the first oscillation interval and the number of interference waveforms during the second oscillation interval; and determining means for calculating the distance of the point of reflection of the optical feedback based on the counting results by the counting means and determining that an object exists in the direction of emission of the laser light if this distance is closer than a predetermined reference distance.

The present invention enables the stabilized detection of an object by reducing the possibility of an incorrect determination through the provision of a reflection preventing plate of a moth-eye structure. Furthermore, the reflection preventing plate of the moth-eye structure can suppress the reduction in the reflection preventing function, and thus even in an environment that is exposed to the outside air, it is still possible to prevent erroneous detection due to the adhesion of an object onto the reflection preventing plate.

DETAILED DESCRIPTION OF THE INVENTION

Figure 1:
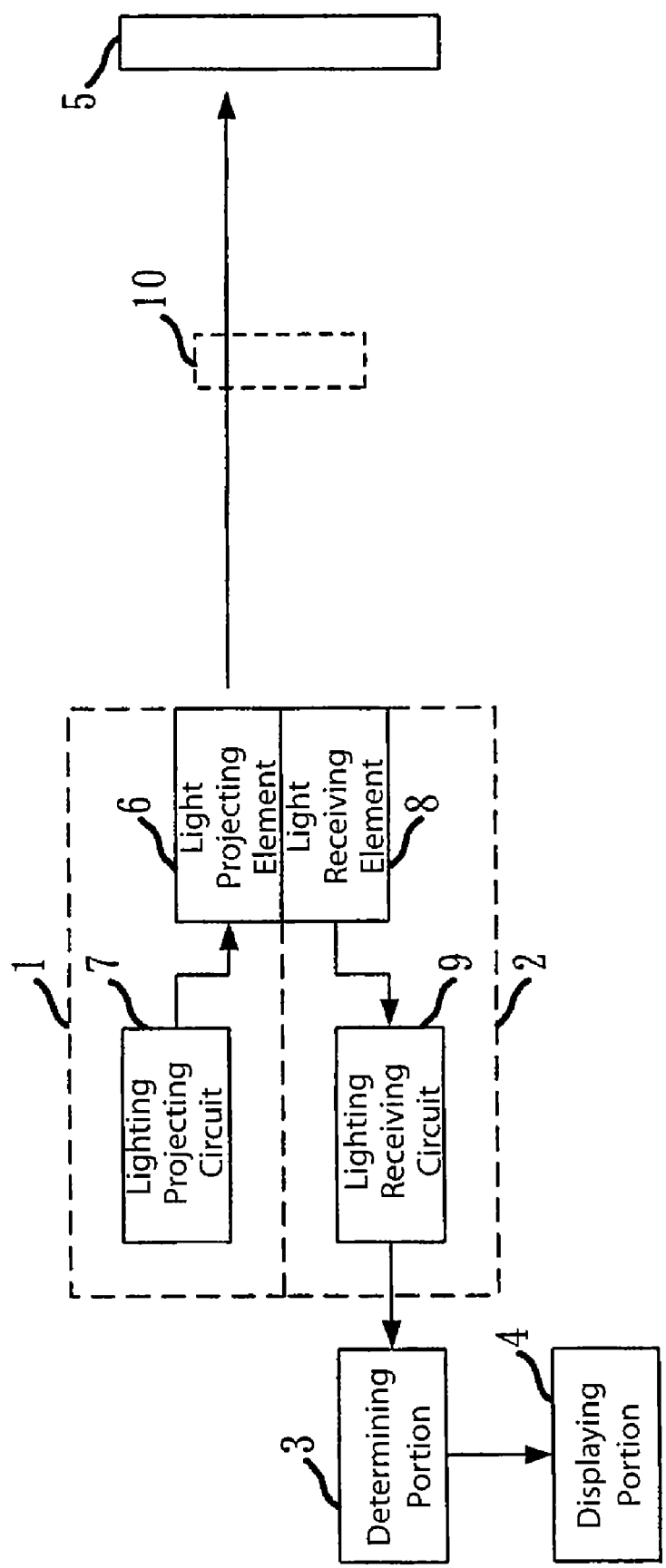
FIG. 1 is a block diagram illustrating the structure of a reflective photoelectric sensor according to an embodiment according to the present invention.

An embodiment according to the present invention will be described below in reference to the drawings. FIG. 1 is a block diagram illustrating the structure of a reflective photoelectric sensor according to the present invention.

The reflective photoelectric sensor has: a light projecting device 1 for emitting light; a light receiving device 2 for receiving optical feedback; a determining portion 3 for determining whether or not an object exists in the direction in which the light is emitted from the light projecting device 1, based on the magnitude of the optical feedback; a displaying portion 4 for displaying the determination results of the determining portion 3; and a moth-eye structure reflection preventing plate 5 disposed at a position on the optical path of the light that is emitted from the light projecting device 1 at a position that is more distant than the location at which the object is anticipated to appear.

The light projecting device 1 is structured from a light projecting element 6, such as an LED, and a light projecting circuit 7 that drives the light projecting element 6. The light receiving device 2 is structured from a light receiving element 8, such as a photodiode, and a light receiving circuit 9 for converting the output current of the light receiving element 8 into a voltage and then amplifying that voltage.

The light projecting device 1 emits light for detecting the object. When no object exists between the light projecting device 1 and the reflection preventing plate 5, then the light that is emitted from the light projecting device 1 will be incident on the reflection preventing plate 5.

Figure 2:
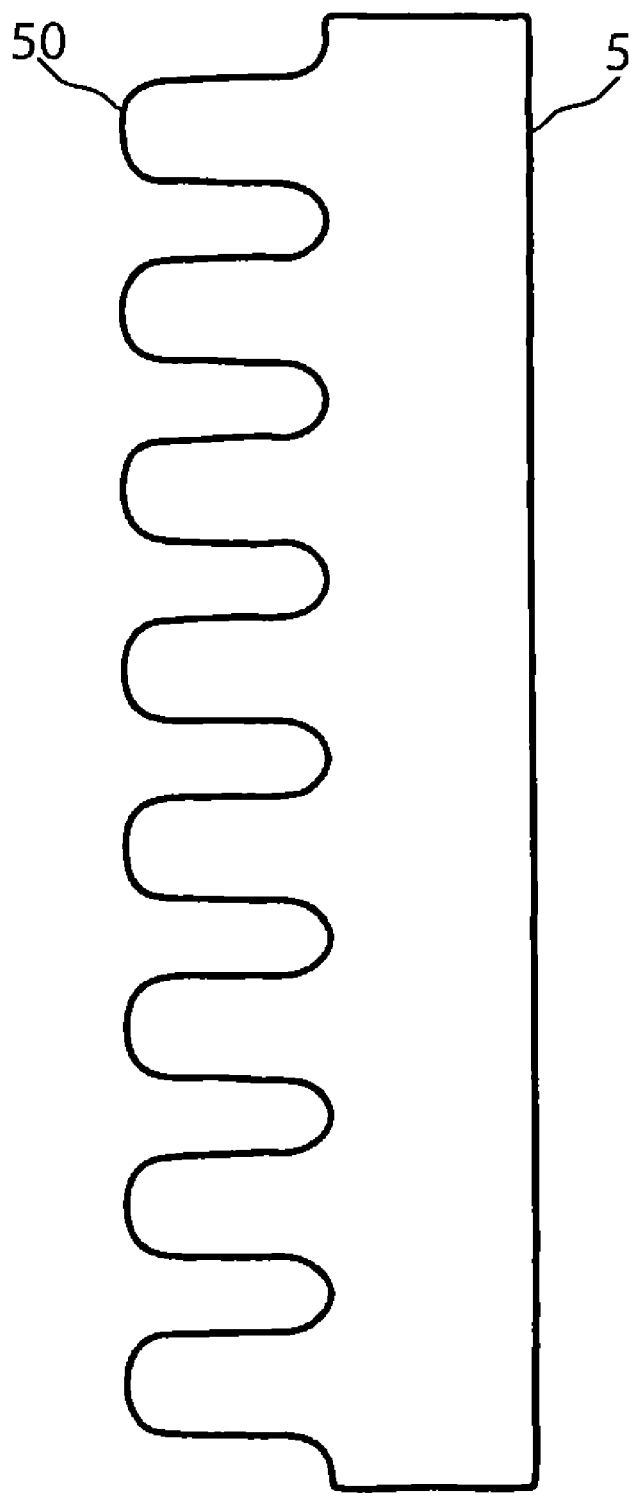
FIG. 2 is a cross-sectional diagram illustrating a first composition example of a reflection preventing plate according to the present invention.

FIG. 2 is a cross-sectional diagram illustrating a first composition example of the reflection preventing plate 5. The reflection preventing plate 5, as illustrated in FIG. 2, has a moth-eye structure wherein a large number of protrusions 50, with sizes less than the wavelength of visible light, are disposed on the surface on the light projecting device side. The protrusions 50 are disposed in an orderly manner with a spacing of, for example, 100 nm. This type of moth-eye structure can be formed from, for example, plastic.

In the moth-eye structure, the index of refraction in the direction of thickness varies continuously, and thus there is essentially no reflection of the incident light, where the optical reflectivity is, for example, no more than 0.1%. This reflectivity is extremely small when compared to the conventional reflection preventing film. Consequently, even if light from the light projecting device 1 were incident onto the reflection preventing plate 5, the magnitude of the optical feedback from the reflection preventing plate 5 would be extremely small. This type of moth-eye structure is disclosed in, for example, Japanese Examined Patent Application Publication 2001-517319.

On the other hand, as illustrated by the dotted line in FIG. 1, when an object 10 exists between the light projecting device 1 and the reflection preventing plate 5, then the optical feedback from the object 10 will be incident into the light receiving device 2. The determining portion 3 detects the magnitude of the optical feedback through the electric signal that is outputted from the light receiving circuit 9 of the light receiving device 2. When there is no object 10 between the light projecting device 1 and the reflection preventing plate 5, then, as described above, the magnitude of the optical feedback will be extremely small, and will be less than a predetermined threshold point. In contrast, when an object 10 exists between the light projecting device 1 and the reflection preventing plate 5, the magnitude of the optical feedback will exceed the threshold point. If the magnitude of the optical feedback exceeds the threshold point, then the determining portion 3 determines that an object 10 exists between the projecting device 1 and the reflection preventing plate 5. The displaying portion 4 displays the determination results of the determining portion 3.

As described above, in the present form of embodiment, the provision of the reflection preventing plate 5 with the moth-eye structure enables the reflectivity of the background to be reduced extremely, and thus the background will not be detected as an object, making it possible to reduce the effect of the background. In the present example of embodiment, the difference in reflectivities between the object and the reflection preventing plate 5 can be ensured adequately, and thus even if the reflectivity of the object is small, it will still be possible to detect the object.

Additionally, when a conventional reflection preventing film is used as the reflection preventing plate, the reflection preventing function is reduced when soil is adhered to the surface, but the reflection preventing plate 5 having the moth-eye structure has a volatilizing effect, which is able to prevent the adherence of soil to the surface, and thus this can suppress the reduction in the reflection preventing function, making it possible to prevent incorrect detection due to the adherence of an object to the reflection preventing plate 5, even in an environment exposed to the outside air.

While in the above embodiment the present invention was applied to a diffuse reflective photoelectric sensor, the present invention can also be applied to a BGS photoelectric sensor. The overall structure of the BGS photoelectric sensor is the same as in the above embodiment, having a detailed structure as disclosed in patent Reference 2 and Patent Reference 3 JP '135 and JP '237, so detailed explanations will be omitted, and a brief description will be given using the codes in FIG. 1.

In the BGS photoelectric sensor, a light projecting device 1 and a light receiving device 2 are used to measure the distance to the object optically. While there are several principles for methods of optically measuring the distance, an explanation will be given for the case of using the principle of triangulation distance measurement as an example. In this case, two separated photodiodes or positioned detecting elements are used as the light receiving element 8. The optical feedback that is reflected from the object 10 is focused onto the light receiving element 8. The position of the focus will vary depending on the distance between the light receiving element 8 and the object 10. Doing so makes it possible to calculate the distance of the object 10.

The determining portion 3 calculates the distance between the light receiving element 8 and the point of reflection from a detection signal of the light receiving circuit 9 of the light receiving device 2 using a principle such as described above, and makes an ON determination (that there is an object) if the distance is closer than a predetermined reference distance, or an OFF determination (that there is no object) if the distance is more distant than the reference distance.

In this type of BGS photoelectric sensor, the use of the reflection preventing plate 5 as explained in the above of embodiment enables a stabilization of the operation of the photoelectric sensor.

Note that the determining portion 3 in the first and second forms of embodiment may be embodied in, for example, a computer that is equipped with a CPU, a memory device, and an interface. The CPU may execute the processes described in the above embodiments in accordance with a program that is stored in the memory device.

Figure 3:
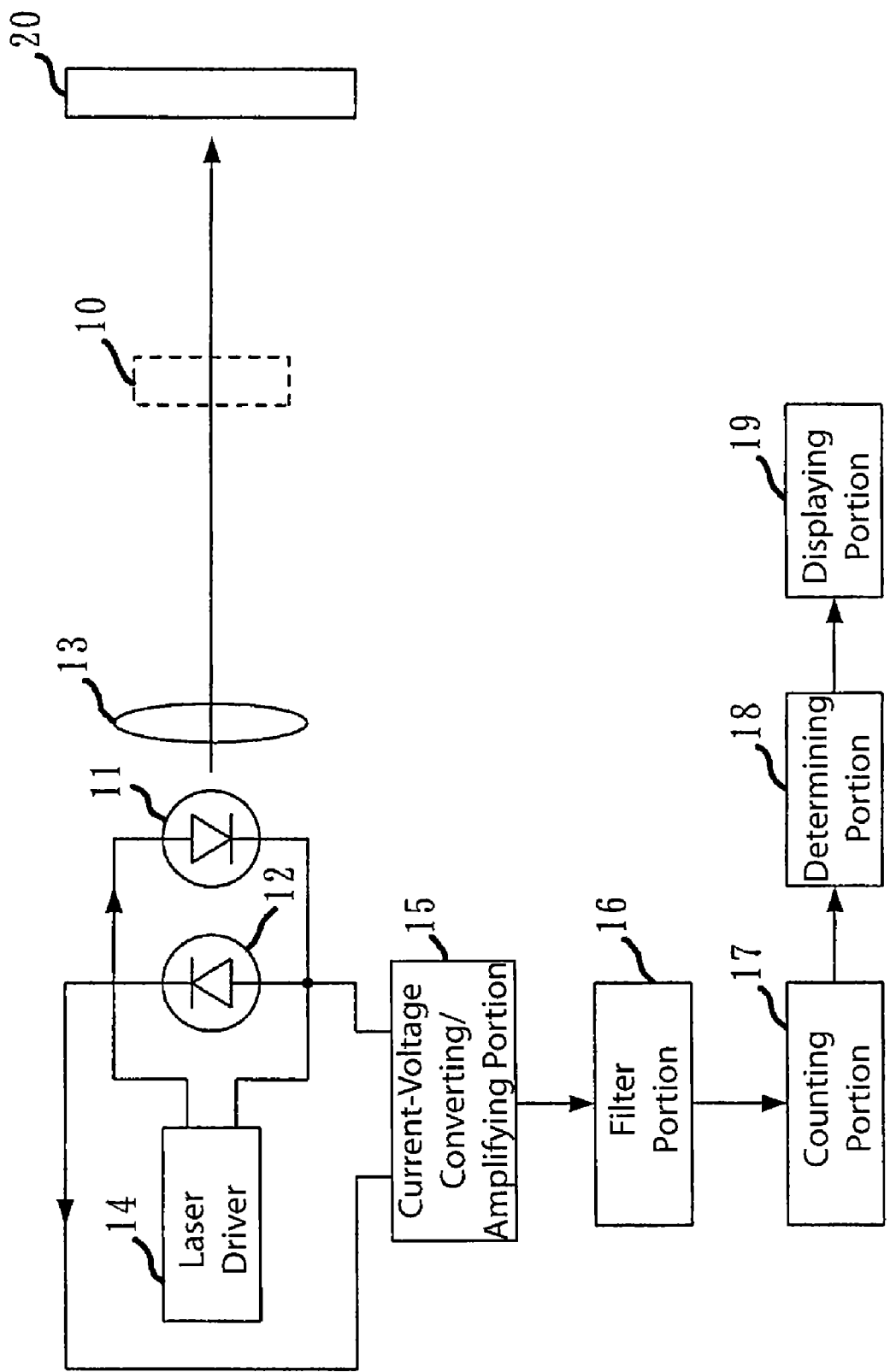
FIG. 3 is a block diagram illustrating the structure of a reflective photoelectric sensor according to another embodiment according to the present invention.

A further embodiment according to the present invention will be explained next. FIG. 3 is a block diagram illustrating the structure of a reflective photoelectric sensor according to the present invention. The present embodiment is a BGS photoelectric sensor that uses a self-coupling laser measuring device.

The reflective photoelectric sensor of FIG. 3 has: a semiconductor laser 11 for emitting a laser light; a photodiode 12 for converting into an electric signal the light that is outputted from the semiconductor laser 11; a lens 13 that focuses and emits the light from the semiconductor laser 11 and focuses the optical feedback from the object, causing causes to be incident into the semiconductor laser 11; a laser driver 14 for driving the semiconductor laser 11; a current-voltage converting/amplifying portion 15 for converting into a voltage the output current from the photodiode 12 and then amplifying; a filter portion 16 for excluding the carrier wave from the output voltage of the current-voltage converting/amplifying portion 15; a counting portion 17 for counting the number of MHPs included in the output voltage of the filter portion 16; a determining portion 18 for determining, from the counting result of the counting portion 17, whether the object is at a distance that is closer than or more distant than the predetermined reference distance; a displaying portion 19 for displaying the result of the determination by the determining portion 18; and a reflection preventing plate 20.

The photodiode 12 and the current-voltage converting/amplifying portion 15 structures the detecting means, where the filter portion 16, the counting portion 17, and the determining portion 18 structure the distance determination processing means. For ease in explanation, it will be assumed that the semiconductor laser 11 is of a type that does not have the mode hopping phenomenon (that is, of the VCSEL type or the DFB laser type).

Figure 4:
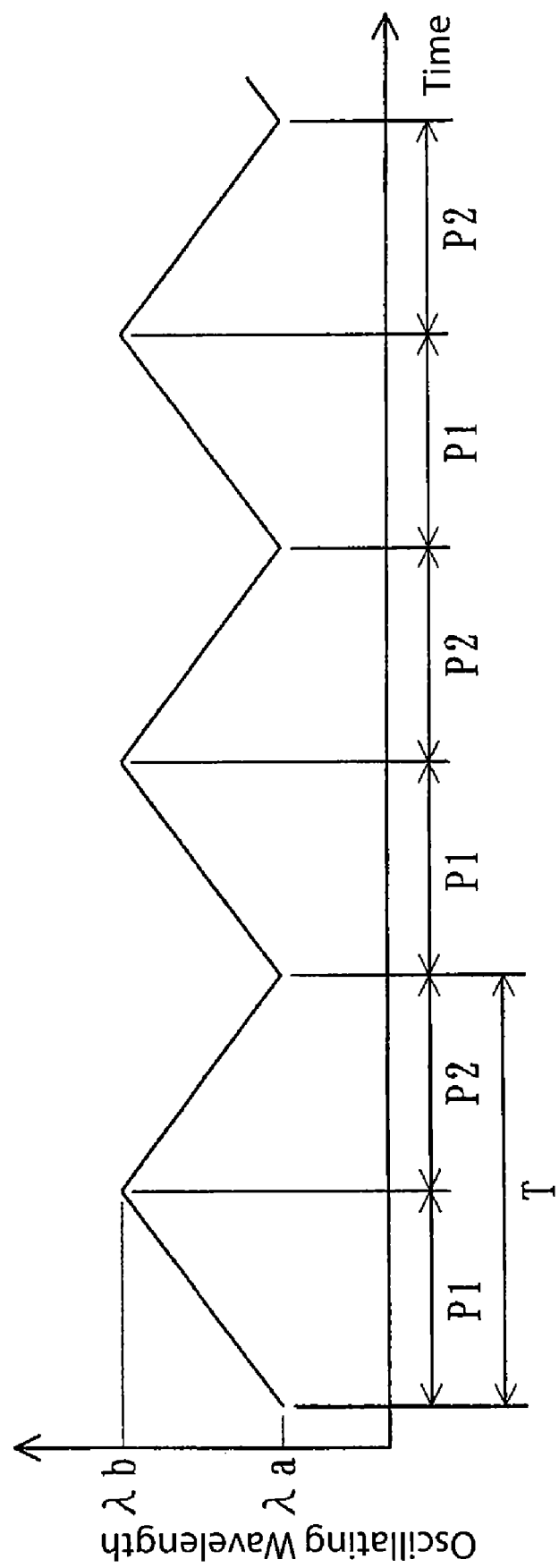
FIG. 4 is a diagram illustrating one example of the change in the oscillating wavelength of the semiconductor laser over time according to the present invention.

The laser driver 14 supplies, as an injection current to the semiconductor laser 11, a triangle wave driving current that is iteratively increased and decreased, at a constant rate of change in respect to time. As a result, the semiconductor laser 11 is driven so as to alternatingly iterate a first oscillating period wherein the oscillating wavelength is increased continuously at a constant rate of change, in proportion with the magnitude of the injected current, and a second oscillating period wherein the oscillating wavelength decreases continuously at a constant rate of change. FIG. 4 is a diagram illustrating the change in the oscillating wavelength of the semiconductor laser 11 over time. In FIG. 4, P1 is the first oscillating period; P2 is the second oscillating period; $\lambda a$ is the minimum value of the oscillating wavelengths in each of the periods; $\lambda b$ is the maximum value for the oscillating wavelengths in each of the periods; and T is the period for the triangle wave. In the present embodiment, the maximum value for the oscillating wavelength $\lambda b$ and the minimum value for the oscillating wavelength $\lambda a$ are each always constant values, and the difference $\lambda b - \lambda a$ therebetween is always the same.

The laser light that is emitted from the semiconductor laser 11 is focused and emitted by the lens 13. If there is an object 10 between the semiconductor laser 11 and the reflection preventing plate 20, then the light that is reflected by the object 10 is focused by the lens 13 to be incident into the semiconductor laser 11. However, the focusing by the lens 13 is not a requirement. The photodiode 12 is disposed either within or in the vicinity of the semiconductor laser 11, and converts the optical output from the semiconductor laser 11 into an electric current. The current-voltage converting/amplifying portion 15 performs voltage conversion and implication of the output current from the photodiode 12.

Figures 5A, 5B:
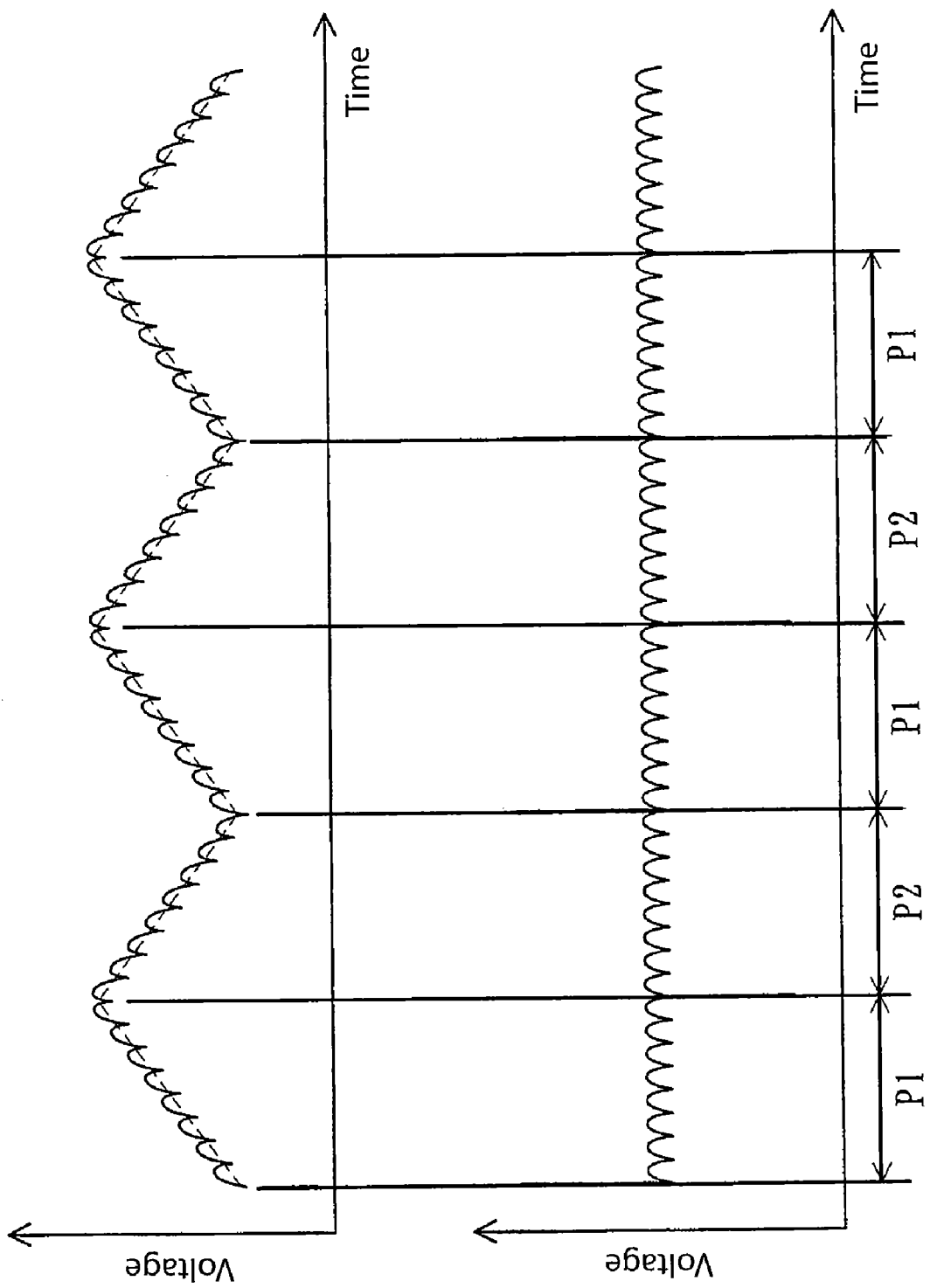
FIG. 5 is a waveform diagram illustrating schematically the output voltage waveform of the current-voltage converting/amplifying portion and the output voltage waveform of the filter portion according to the present invention.

The filter portion 16 has the function of extracting the superimposed signal from the modulated wave. FIG. 5 (A) is a diagram illustrating schematically the output voltage waveform from the current-voltage converting/amplifying portion 15, and FIG. 15 (B) is a diagram illustrating schematically the output voltage waveform of the filter portion 16.

These figures illustrate the process of extracting the MHP waveform (the interference waveform) of FIG. 5 (B) by removing the oscillation waveform (the carrier wave) of the semiconductor laser 11 of FIG. 4 from the waveform (the modulated wave) of FIG. 5 (A), which corresponds to the output of the photodiode 12.

The counting portion 17 counts the numbers of MHPs included in the output voltage from the filter portion 16 for the first oscillating period P1 and the second oscillating period P2, individually. The counting portion 17 may use a counter structured from a logical gate, or may use FFT (Fast Fourier Transform) to count the frequency of the MHPs (or in other words, to count the number of MHPs per unit time).

Next, the determining portion 18 calculates the distance between the semiconductor laser 11 and the point of reflection based on the number of MHPs measured by the counting portion 17, to determine whether the point of reflection of the optical feedback is at a distance that is closer than, or a distance that is more distant than, a predetermined reference distance. The number of MHPs per constant period is proportional to the measurement distance. Given this, the relationship between the number of MHPs in the constant counting period and the distance is investigated in advance and stored in a database (not shown) in the determining portion 18 (where, in the present example of embodiment, this is done individually for the first oscillating period P1 and the second oscillating period P2), so that the determining portion 18 will be able to calculate the distance of the point of reflection of the optical feedback through obtaining, from the database, the value of the distance corresponding to the number of MHPs measured by the counting portion 17.

Conversely, if an equation indicating the relationship between the number of MHPs in the counting period and the distance is calculated and set in advance, then the determining portion 18 will be able to calculate the distance of the point of reflection of the optical feedback through substituting, into the equation, the number of MHPs measured by the counting portion 17.

The determining portion 18 makes an ON determination (that there is an object) if the distance between the semiconductor laser 11 and the point of reflection of the optical feedback is closer than the predetermined reference distance, and makes an OFF determination (that there is no object) if more distant than the predetermined distance. The determining portion 18 performs a process such as described above for each first oscillating period P1 and for each second oscillating period P2.

The displaying portion 19 displays the determination results of the determining portion 18.

If, at this point, there is no object 10 between the semiconductor laser 11 and the reflection preventing plate 20, then the light that is emitted from the semiconductor laser 11 is incident into the reflection preventing plate 20. The structure of the reflection preventing plate 20 is the same as that of the reflection preventing plate 5 described in the above embodiments. Consequently, even if the light from the semiconductor laser 11 is incident into the reflection preventing plate 20, the magnitude of light that is returned from the reflection preventing plate 20 is extremely small.

As described above, in a BGS photoelectric sensor that uses the self-coupling laser measuring device, if the magnitude of the optical feedback is too great, then a coherent collapse phenomenon will occur. Additionally, when the background is too far to produce the MHP through the self-coupling effect, or if an adequate signal strength in order to detect the MHP cannot be obtained, there will still be the possibility of the occurrence of noise, such as optical chaos, in the extremely small optical feedback from the background. In the present form of embodiment, the provision of the reflection preventing plate 20 with the moth-eye structure makes it possible to eliminate this type of problem.

Figure 6:
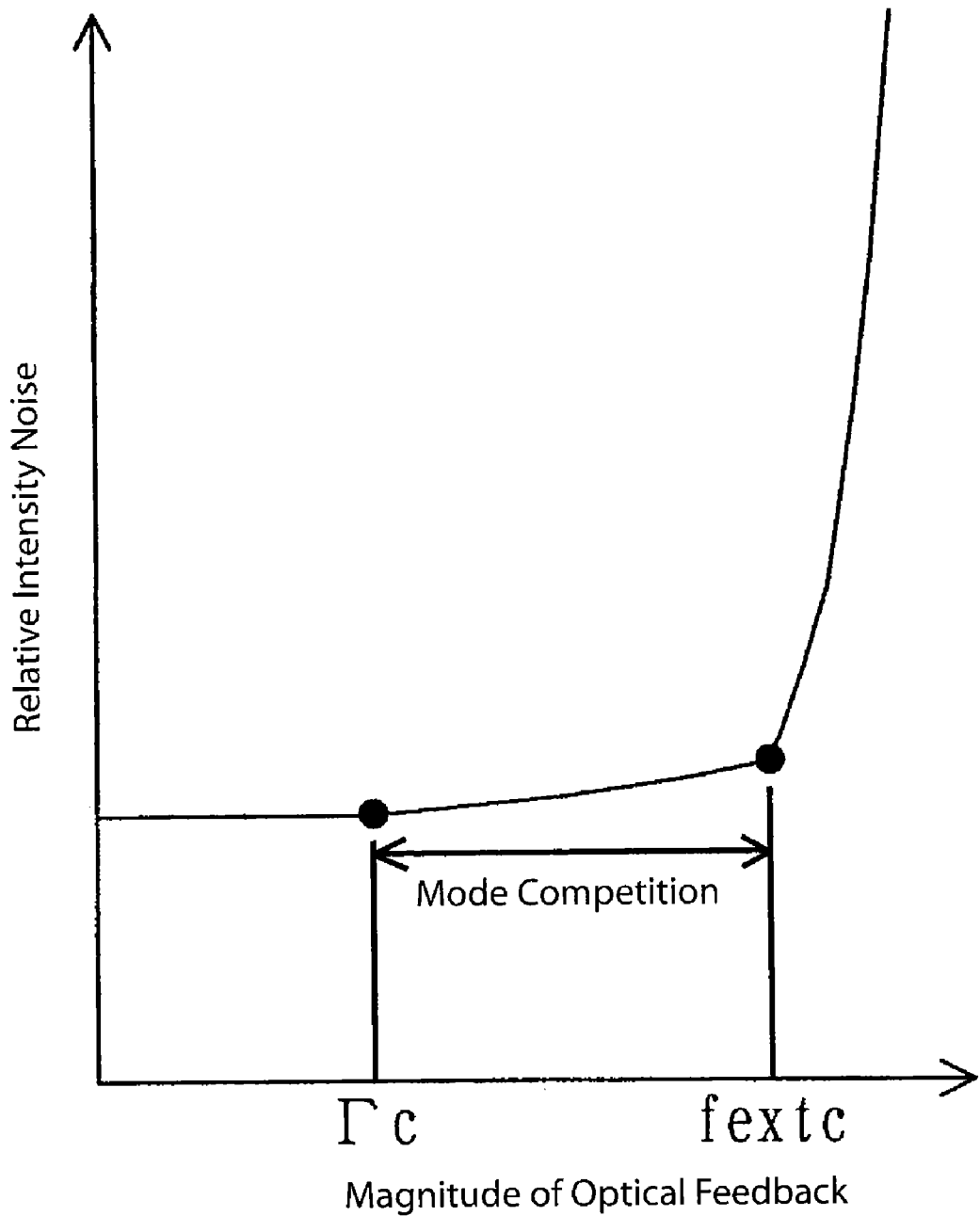
FIG. 6 is a diagram illustrating relatively large changes in the relative intensity noise in relation to the magnitude of the optical feedback magnitude.

The conditions required in the reflection preventing plate 20 in the present example of embodiment will be explained next. As illustrated in FIG. 6, there are two critical points wherein the relative intensity noise that is produced within the semiconductor laser 11 becomes large with an increase in the magnitude of optical feedback. One is the critical point Γc that is produced by the mode competition between the resonator mode of the semiconductor laser 11 itself and the external resonator mode.

The other is the critical point (the critical optical feedback magnitude) fextc due to the coherent collapse. As the magnitude of the optical feedback increases and passes the critical point Γc, then the self-coupling effect, which is a optical feedback interference phenomenon, begins to occur, and when the critical point fextc is past, the relative intensity noise increases suddenly. In order to avoid incorrect MHP measurements due to noise from, for example, optical chaos and due to the coherent collapse phenomenon, thereby measure the MHP in the external resonator mode with stability, it is desirable for the magnitude of optical feedback into the semiconductor laser 11 to be above the threshold point Γc and below the threshold point fextc. Consequently, the reflection preventing plate 20 should be provided so that the magnitude of the optical feedback will be greater than the threshold point Γc and greater than the threshold point fextc, even when there is no object 10.

According to the reference by YAMADA Minoru and SUHARA Michihiko, "Analysis of Optical Feedback Optically Induced Noise in a Semiconductor Laser," Kanagawa University Engineering Department Research Report, OQE 89-50, Pages 85-90, 1989, the threshold point Γc will be as in the following equation:

$$\Gamma c \approx 22 R_2 \cdot [n_r 1\{L(1-R_2)\}]^2 \quad (2)$$

where:
$n_r$ is the index of refraction of the active region; 1 is the laser resonator length; L is the distance between the end surface of the emitting side of the semiconductor laser and the point of reflection of the optical feedback; and $R_2$ is the electric power [SIC] reflectivity at the end surface of the emitting side of the semiconductor laser.

On the other hand, according to Japanese Unexamined Patent Application Publication 2005-252032, the critical point fextc is as in the following equation:

$$fextc = (\tau_L^2 / 16 |C_e|^2) \cdot (K \cdot fr^2 + 1/\tau_e)^2 \cdot ((1+\alpha^2)/\alpha^4) \quad (3),$$

where:
$\tau_L$ is the time over which the light is enclosed in the laser resonator; $C_e$ is the coupling efficiency the optical feedback at the laser emitting end; K is the K factor; fr is the relaxation oscillation frequency; $\tau_e$ is the electron life expectancy; and α is the spectrum linewidth magnification factor.

Note that the counting portion 17 and the determining portion 18 in the present embodiment can be embodied in, for example, a computer that is provided with a CPU, a memory device, and an interface. The CPU executes the processes explained in the present example of embodiment in accordance with a program that is stored in the memory device.

Additionally, when the present form of embodiment is applied to an external interferometer laser sensor other than a self-coupling type, the laser light that is emitted from the semiconductor laser 11 and the optical feedback may be, for example, split by a beam splitter and the optical feedback may be detected by a photodiode 12. Doing so makes it possible to obtain the same effect as in the present form of embodiment even with an external interferometer-type laser sensor, other than a self-coupling type.

Figure 7:
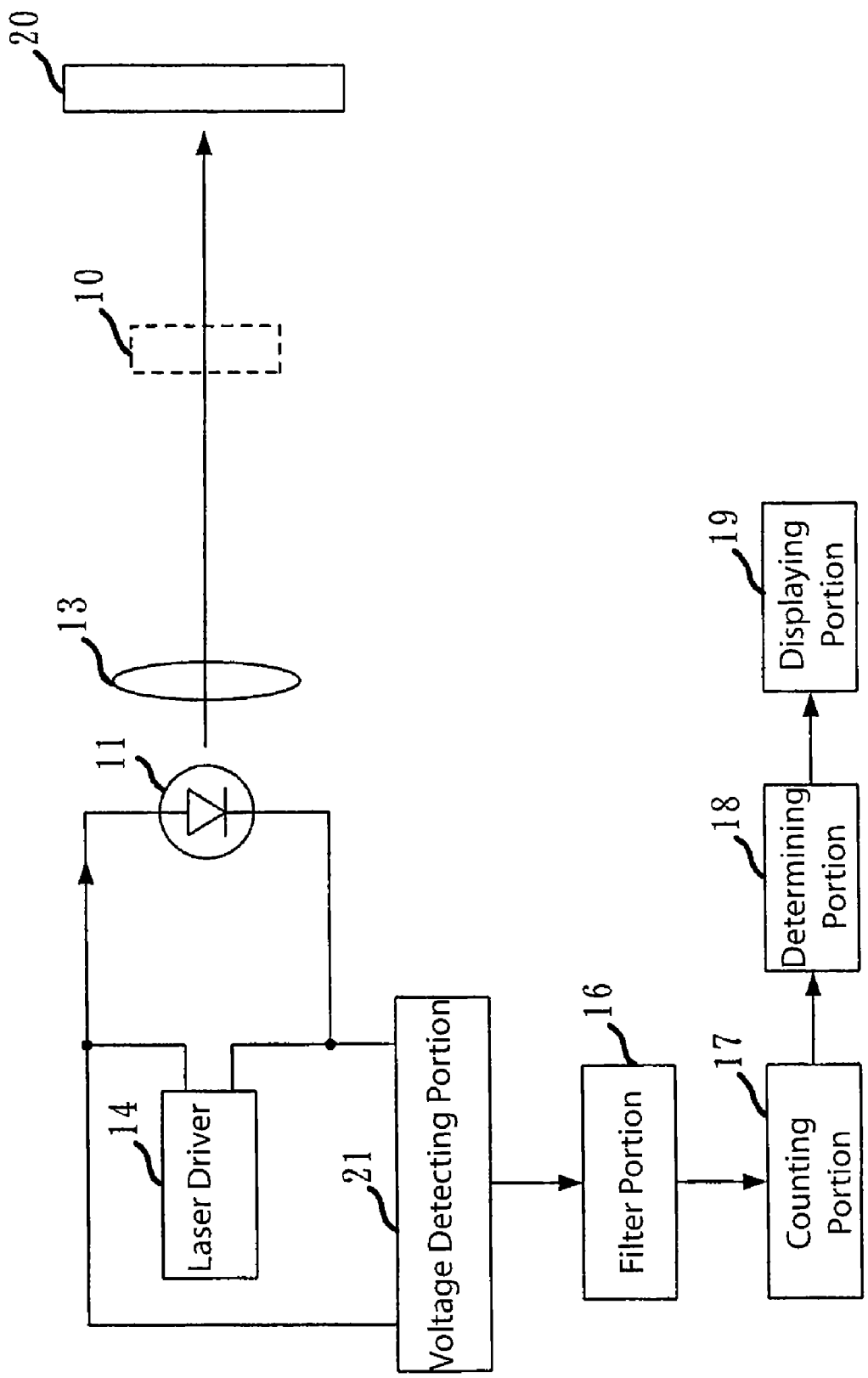
FIG. 7 is a block diagram illustrating the structure of a reflective photoelectric sensor according to a further embodiment according to the present invention.
Figure 8:
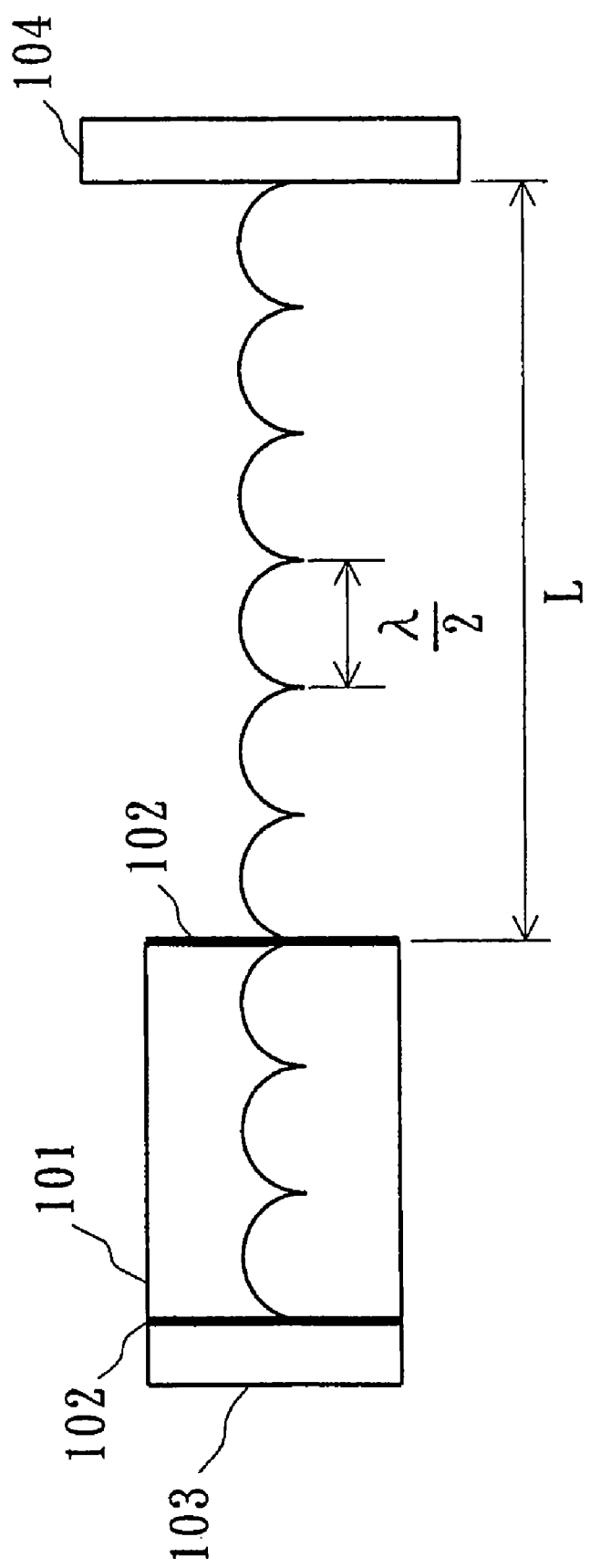
FIG. 8 is a diagram illustrating a semiconductor laser compound resonator model in a conventional laser measuring device.
Figure 9:
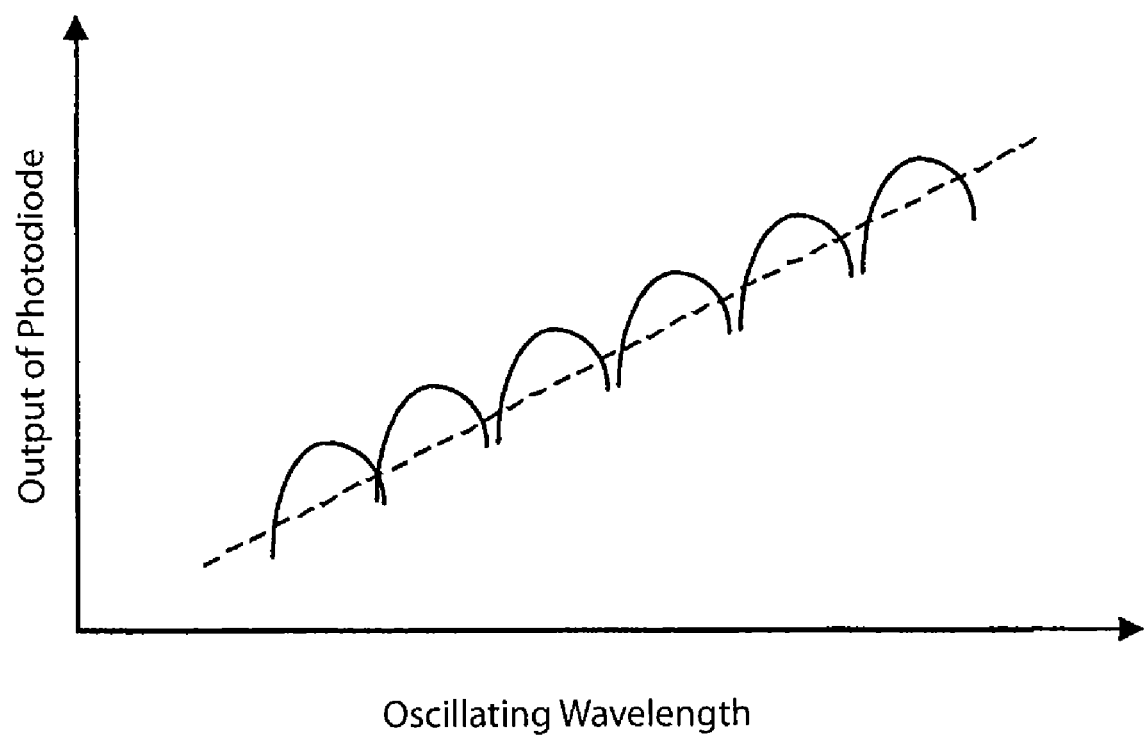
FIG. 9 is a diagram illustrating the relationship between the semiconductor laser oscillating wavelength and the output of the internal photodiodes.

While in the above embodiment the MHP waveform was extracted from the output signal of a photodiode that was the light receiving device, the MHP waveform may be extracted without using a photodiode. FIG. 7 is a block diagram illustrating the structure of a reflective photoelectric sensor according to the present invention, where those structures that are identical to those in FIG. 3 are assigned identical codes. The reflective photoelectric sensor in the present form of embodiment uses a voltage detecting portion 21 instead of the photodiode 12 and the current-voltage converting/amplifying portion 15 in this embodiment.

The voltage detecting portion 21 detects and amplifies the voltage between the terminals of the semiconductor laser 11, or in other words, between the anode and the cathode. When interference occurs due to the laser light that is emitted from the semiconductor laser 11 and the optical feedback from the object 10, the voltage between the terminals of the semiconductor laser 11 appears as the MHP waveform. As a result, it is possible to extract the MHP waveform from the voltage between the terminals of the semiconductor laser 11.

The filter portion 6 has the function of extracting the superimposed signal from the carrier wave, the same as in the third example of embodiment, to extract the MHP waveform from the output voltage from the voltage detecting portion 21. The operations of the semiconductor laser 11, the laser driver 14, the counting portion 17, the determining portion 18, and the displaying portion 19 are the same as in the above embodiment.

In this way, it is possible to extract the MHP waveform without the use of the photodiode, making it possible to reduce the number of components in the reflective photoelectric sensor when compared to that of the previous embodiment, thereby making it possible to reduce the cost of the reflective photoelectric sensor.

Note that the present invention is not limited to the disclosed embodiments, but rather the present invention may be applied to other reflective photoelectric sensors as well.

The present invention can be applied to reflective photoelectric sensors.

The invention claimed is:
1. A reflective photoelectric sensor comprising:
light projector emitting light;
light receiver receiving optical feedback from the light emitted from the light projector;

evaluator determining whether or not an object exists in the direction in which the light is emitted from the light projector, based on the optical feedback; and a reflection preventing plate having a moth-eye structure, disposed at a position on the optical path of the light that is emitted from the light projecting means at a position that is more distant than the location at which the object is anticipated to appear.

2. The reflective photoelectric sensor as set forth in claim 1, wherein:

the evaluator determines whether or not an object exists in the direction in which the light is emitted, based on the optical feedback.

3. The reflective photoelectric sensor as set forth in claim 1, wherein:

the evaluator determines that an object exists in the direction in which the light is emitted when the distance is closer than a predetermined reference distance when calculating the distance of the point of reflection of the optical feedback based on the optical feedback.

4. A reflective photoelectric sensor comprising:

a semiconductor laser emitting a laser light; a laser driver driving the semiconductor laser;

light receiver for converting into an electric signal the laser light that is emitted from the semiconductor laser and an optical feedback from this laser light;

distance determination processor for calculating the distance of the point of reflection of the optical feedback, based on information for an interference waveform that is generated by the laser light and the optical feedback, included in the output information of the light receiver, to determine that an object exists in the direction in which the laser light is emitted, if this distance is closer than a predetermined reference distance; and a reflection preventing plate having a moth-eye structure, disposed at a position on the optical path of the laser light that is emitted from the semiconductor laser at a position that is more distant than the location at which the object is anticipated to appear.

5. The reflective photoelectric sensor as set forth in claim 4, wherein:

the laser driver causes the semiconductor laser to operate so as to alternate between a first oscillation interval that includes at least an interval wherein the oscillation wavelength is increased continuously and monotonically, and a second oscillation interval which includes at least an interval wherein the oscillation wavelength is decreased continuously and monotonically; and wherein:

the distance determination processor comprises:

a counter counting the number of interference waveforms during the first oscillation interval and the number of interference waveforms during the second oscillation interval; and a determiner calculating the distance of the point of reflection of the optical feedback based on the counting results by the counter and determining that an object exists in the direction of emission of the laser light if this distance is closer than a predetermined reference distance.

6. A reflective collector sensor comprising:

a semiconductor laser emitting a laser light; a laser driver driving the semiconductor laser;

detector detecting an electric signal that includes an interference waveform that is produced through the self-coupling effect between the laser light that is emitted from the semiconductor laser and optical feedback of this laser light;

distance determination processor transmitting the distance of the point of reflection of the optical feedback, based on the interference waveform information that is included in the output signal from the detector, to determine that an object exists in the direction of the emission of the laser light if the distance is closer than a predetermined reference distance; and a reflection preventing plate having a moth-eye structure, disposed at a position on the optical path of the laser light that is emitted from the semiconductor laser at a position that is more distant than the location at which the object is anticipated to appear.

7. The reflective photoelectric sensor as set forth in claim 6, wherein:

the reflection preventing plate is disposed so that a magnitude of the optical feedback from the reflection preventing plate when there is no object is greater than a critical point $\Gamma c$ and less than a critical point fextc, when the critical point $\Gamma c$ of the magnitude of the optical feedback that produces a mode competition between the resonator mode of the semiconductor laser itself and an external resonator mode, and fextc is the critical point for a magnitude of the optical feedback due to a coherent collapse.

8. An object detecting method comprising the steps of:

emitting light based on a light projecting procedure;

receiving optical feedback of the light emitted in the light projecting procedure based on a light receiving procedure;

determining whether or not an object exists in the direction in which light is emitted in the light projecting procedure, based on the optical feedback based on a determining procedure; and disposing a reflection preventing plate of a moth-eye structure at a position on the optical path of the light that is emitted in the light projecting procedure at a position that is more distant than the location at which the object is anticipated to appear.

9. The object detecting method as set forth in claim 8, wherein:

the determining procedure determines whether or not an object exists in the direction in which the light is emitted, based on the magnitude of optical feedback.

10. The object detecting method as set forth in claim 8, wherein the determining procedure comprises the steps of: calculating, based on the optical feedback, the distance of the point of reflection of the optical feedback, and determining that an object exists in the direction in which the light is emitted if this distance is closer than a predetermined reference distance.

11. An object detecting method comprising the steps of:

supplying a driving electric current to a semiconductor laser to cause the semiconductor laser to operate based on an oscillating procedure;

converting into an electric signal the laser light emitted from the semiconductor laser and the optical feedback of that laser light based on a light receiving procedure;

calculating the distance of the point of reflection of the optical feedback based on interference waveform information generated by the laser light and the optical feedback included in the output signal obtained from the light receiving procedure to determine that an object exists in the direction in which the laser light is emitted when this distance is closer than a predetermined reference distance based on a distance determination processing procedure; and disposing a reflection preventing plate of a moth-eye structure at a position on the optical path of the laser light that is emitted from the semiconductor laser at a position that is more distant than the location at which the object is anticipated to appear.

12. The object detecting method as set forth in claim 11, wherein:

the oscillating procedure causes the semiconductor laser to operate so as to alternate between a first oscillation interval that includes at least an interval wherein the oscillation wavelength is increased continuously and monotonically, and a second oscillation interval which includes at least an interval wherein the oscillation wavelength is decreased continuously and monotonically; and wherein:

the distance determination processing procedure comprises the steps of: counting the number of interference waveforms during the first oscillation interval and the number of interference waveforms during the second oscillation interval; and calculating the distance of the point of reflection of the optical feedback based on the counting results by the counting means and determining that an object exists in the direction of emission of the laser light if this distance is closer than a predetermined reference distance.

13. An object detecting method, comprising the steps of:

supplying a driving electric current to a semiconductor laser to cause the semiconductor laser to operate based on an oscillating procedure;

detecting an electric signal including an interference waveform produced through the self-coupling effect of the laser light that is emitted from the semiconductor laser and the optical feedback from the laser light based on a detecting procedure;

calculating the distance of the point of reflection of the optical feedback based on interference waveform information included in the output signal obtained in the detecting procedure to determine that an object exists in the direction in which the laser light is emitted when this distance is closer than a predetermined reference distance based on a distance determination processing procedure; and disposing a reflection preventing plate of a moth-eye structure at a position on the optical path of the laser light that is emitted from the semiconductor laser at a position that is more distant than the location at which the object is anticipated to appear.

14. An The object detecting method as set forth in claim 13, wherein:

the reflection preventing plate is disposed so that the magnitude of the optical feedback from the reflection preventing plate when there is no object is greater than the critical point $\Gamma c$ and less than the critical point $f_{extc}$, when the critical point $\Gamma c$ of the magnitude of the optical feedback that produces a mode competition between the resonator mode of the semiconductor laser itself and an external resonator mode, and $f_{extc}$ is the critical point for the magnitude of the optical feedback due to a coherent collapse.

* * * * *